Dec. 15, 1931.  J. O. GOODWIN  1,836,752
METHOD AND APPARATUS FOR MOLDING ARTICLES OF PLASTIC MATERIAL
Filed March 22, 1928   2 Sheets-Sheet 1

Inventor
John O. Goodwin
By Pierson, Eskin & Avery
Attys

Dec. 15, 1931.  J. O. GOODWIN  1,836,752
METHOD AND APPARATUS FOR MOLDING ARTICLES OF PLASTIC MATERIAL
Filed March 22, 1928    2 Sheets-Sheet 2
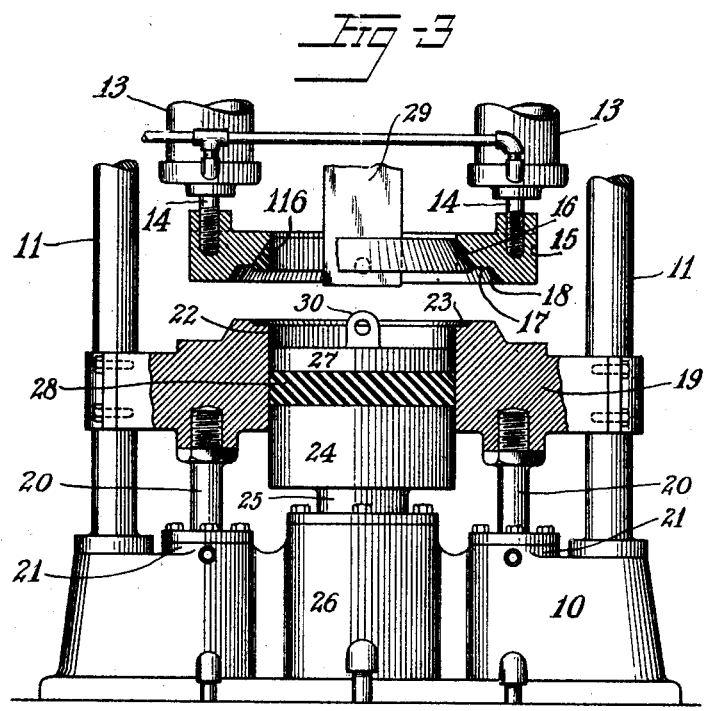
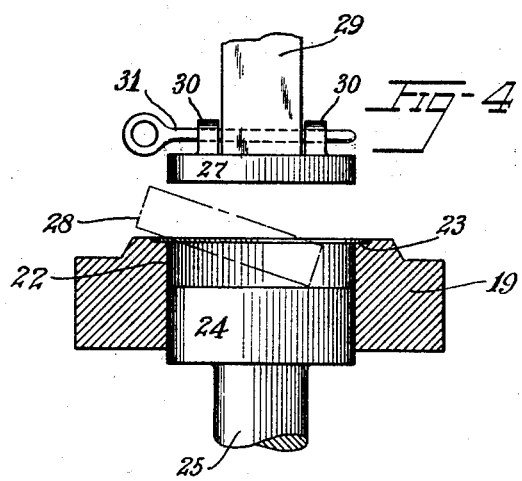
Inventor
John O. Goodwin
By Pierson, Eakin & Avery
Attys.

Patented Dec. 15, 1931

1,836,752

UNITED STATES PATENT OFFICE

JOHN O. GOODWIN, OF AKRON, OHIO, ASSIGNOR TO THE B. F. GOODRICH COMPANY, OF NEW YORK, N. Y., A CORPORATION OF NEW YORK

METHOD AND APPARATUS FOR MOLDING ARTICLES OF PLASTIC MATERIAL

Application filed March 22, 1928. Serial No. 263,683.

This invention relates to methods and apparatus for molding articles of plastic material such as an unvulcanized rubber composition, a plasticized clay or the like, and is an improvement upon that of MacDonald United States Patent No. 1,658,567, granted February 7, 1928.

One of my chief objects is to provide for readily releasing the molded article from the members by which it is molded, so that, for example, it may be given further treatment, such as vulcanization in the case of rubber goods or firing in the case of clay products, either without confinement or while confined in other molding equipment. Other objects are simplicity of structure and facility and accuracy in the molding operation, and especially in the molding of annular articles.

Of the accompanying drawings:

Fig. 3 is a similar view showing a still later stage.

Fig. 4 is an elevation, with a part in section, of certain elements of the apparatus, illustrating the charging of the device with moldable material.

Figure 1:
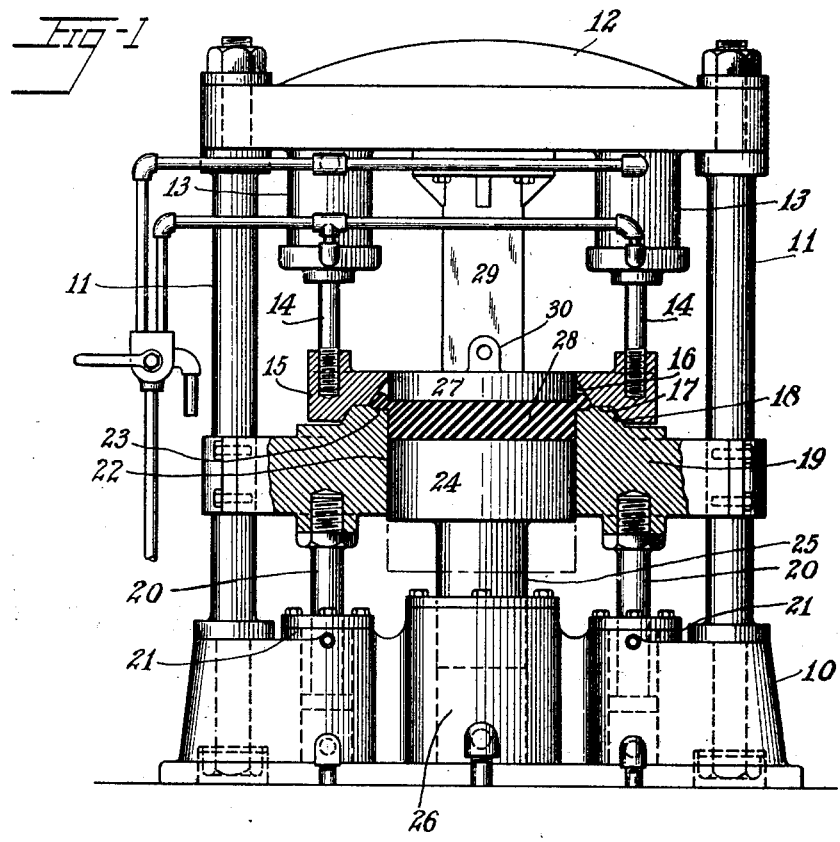
Fig. 1 is an elevation, with parts sectioned and broken away, of apparatus embodying and adapted to carry out my invention in its preferred form.

The apparatus comprises a base 10 having mounted therein a pair of tie rods 11, 11 which are connected at their tops by a cross member or head 12 which is provided on its under side with a pair of double-acting fluid-pressure cylinders 13, 13, of which the piston rods 14, 14 are rigidly connected with an annular upper mold member 15 formed with a downwardly flared inner molding face 16 adapted to mold the corresponding face of an annular member such as the sealing gasket 116 shown in Fig. 3, which, in this particular instance, is substantially triangular in cross section.

Below the beveled mold face 16 the mold section 15 is formed with a plane abutment face 17 and with a downwardly flared, beveled, guiding face 18 adapted to inter-fit with a complementary beveled annular face formed upon an annular lower mold section 19 which is secured upon the upper ends of the piston rods 20, 20 of a pair of double-acting fluid-pressure cylinders 21, 21 formed in the base member 10.

The lower mold section 19 is formed with a cylindrical inner face 22 defining a central space having the same diameter as the inner diameter of the ring to be molded and at its upper end is formed with a plane face adapted to fit against the plane face 17 of the upper mold section and with an annular, approximately plane molding face 23 adapted to shape the lower face of the ring 116.

Slidably fitted within the central space of the lower mold section 19 is a cylindrical plunger or ram head 24 formed upon the upper end of a fluid-pressure ram 25 which is mounted in a ram cylinder 26 formed in the base 10 at the middle thereof.

A disc-like plug member 27 having a cylindrical periphery and adapted slidably to fit within the lower mold section 19 and the upper mold section 15 is adapted to be placed within the lower mold section 19 on top of a charge of moldable material 28 placed therein and to be stopped in upward movement of the ram 25 by abutting a stationary stop member 29 secured to and projected downwardly from the head 12. The plug member 27 is formed on its upper face with a pair of apertured ears 30, 30 and the stop member 29 is transversely apertured near its lower end for the reception of a pin 31 for securing the plug member 27 to the stop member 29 to hold it in an elevated position, as shown in Fig. 4, for convenience in charging the device with plastic material. The several cylinders are provided with the usual piping, as shown, and the upper cylinders 13 are of such diameter as to exert a greater downward force than the upward force of the lower cylinders 21.

In the operation of the apparatus, the upper mold section 15 being elevated and the lower mold section 19, ram head 24 and plug member 27 being in the relative positions in which they are shown in Fig. 4, a block of the moldable material 28 is placed in the lower mold section 19 upon the ram head 24.

The plug member 27 is then released from the stop member 29 by drawing the pin 31 and is allowed to rest upon the stock 28 approximately as shown in Fig. 3. The upper mold section 15 is then lowered to its lowermost position and the lower mold section 19 is raised until it is stopped by abutting the upper section 15, the two interfitting as shown in Fig. 1, the upper cylinders 13 being kept charged above their pistons to hold the upper mold section 15 in its lowermost position.

As the lower mold section 19 is raised into contact with the upper mold section 15 the ram 25 also is forced upward, carrying upward the charge of stock 28 and the plug member 27 thereon until the plug member abuts and is stopped by the stop member 29, at which time the several members are as shown in Fig. 1. Pressure under the ram 25 is thereafter continued so that the compression of the stock between the ram head 24 and the plug member 27 causes the stock to be extruded into the annular mold cavity defined by the plug member 27 and mold sections 15 and 19.

Figure 2:
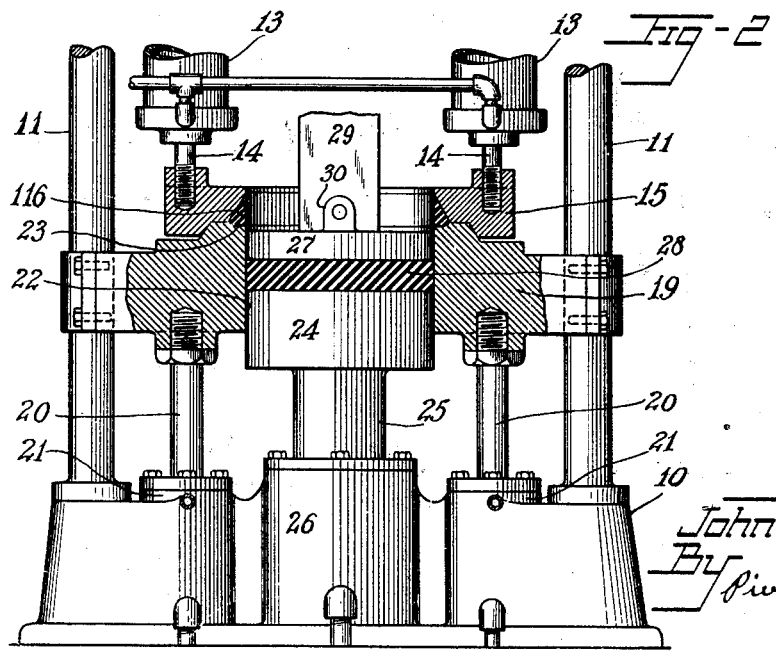
Fig. 2 is a similar, fragmentary view, illustrating a later stage of operation.

When the mold cavity has been completely filled with the stock and while it receives the full molding force of the ram head 24, the upper ends of the cylinders 13 are slowly vented with the result that the lower cylinders 21 force the two mold sections 15 and 19 upward until the molding faces have moved upward entirely past the plug member 27, the members then occupying the positions shown in Fig. 2, and in this upward movement of the mold sections 15 and 19 the stock within the annular molding cavity is sheared off, by the coaction of the plug member 27 with the lower mold section 19, from the supply mass of stock which remains between the plug member 27 and the ram head 24.

While the upper mold section 15 remains in its uppermost position, as shown in Fig. 3, the ram 25 and the lower mold section 19 are lowered to the positions in which they are shown in Fig. 3, the plug member 27 descending with them and the molded ring 116 being left in the upper mold section 15, from which it is then readily removed by hand.

The upper mold section 15 is then lowered to its lowermost position and the operation as described is repeated for the molding of successive rings.

Modifications are possible within the scope of my invention as defined by the appended claims.

I claim:

1. The method of molding an article of plastic material which comprises supporting a plurality of mold members in association to define a mold cavity, forcing stock into said cavity by extruding it from a supply mass of stock to fill the cavity, moving the mold members as a unit with relation to the extruding means to shear off the molded stock in the cavity from the supply mass and by continuation of such movement to clear the molded stock from the extruding means and thereby open the cavity, and separating the mold members to release the molded stock.

2. The method of molding an article of plastic material which comprises supporting a plurality of mold members in association to define an annular mold cavity, forcing stock into said cavity from a supply mass by flow transverse to the axis of the annulus, moving the mold members as a unit with relation to the forcing means to shear off the molded stock in the cavity from the supply mass and by continuation of such movement to clear the molded stock from the forcing means and thereby open the cavity, and separating the mold members to release the molded stock.

3. Molding apparatus comprising a plurality of mold members adapted to be assembled to define an open mold cavity, means for extruding plastic stock from a supply mass into said cavity, the extruding means being so shaped as to be adapted substantially to seal against the mold members about the mouth of said cavity and to coact with at least one of said members to shear off from the supply mass the molded stock extruded into the cavity, and means for so moving the mold members as a unit with relation to the extruding means as to effect the shearing action and clear the molded stock from the extruding means, said mold members being mounted for determinate relative movement into and out of association with each other to define the cavity and to release the molded stock therefrom.

4. Molding apparatus comprising a plurality of mold members adapted to be assembled to define an annular mold cavity having an open side throughout its length, extruding means so shaped as to be adapted substantially to seal against the assembly of mold members for extruding stock from a supply mass into said cavity, and means for so moving the mold members as a unit with relation to the extruding means as to shear off from the supply mass the molded stock within the cavity and by continuation of said movement clear the said molded stock from the extruding means thereby opening the cavity.

5. Molding apparatus comprising extruding means and a plurality of mold members mounted for determinate relative movement into and out of contact with each other and for determinate movement as a unit in contact with each other with relation to the extruding means and so shaped as to define when in contact with each other an open mold cavity, the extruding means being so positionable with relation to the mold members as substantially to seal against the same for extrusion of stock into the cavity defined thereby and means for so moving said mold members.

6. Molding apparatus as defined in claim 5 in which the mold members are shaped to define between them an annular mold cavity and are mounted for relative movement in an axial direction into and out of contact with each other.

In witness whereof I have hereunto set my hand this 16th day of March, 1928.

JOHN O. GOODWIN.